US010423792B2

(12) United States Patent
Clifton

(10) Patent No.: US 10,423,792 B2
(45) Date of Patent: Sep. 24, 2019

(54) IDENTIFYING EXPLOITABLE CODE SEQUENCES

(71) Applicant: Red Hat, Inc., Raleigh, NC (US)

(72) Inventor: Nick Clifton, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 177 days.

(21) Appl. No.: 15/274,817

(22) Filed: Sep. 23, 2016

(65) Prior Publication Data

US 2018/0089421 A1 Mar. 29, 2018

(51) Int. Cl.
G06F 21/57 (2013.01)
G06F 21/56 (2013.01)

(52) U.S. Cl.
CPC .......... G06F 21/577 (2013.01); G06F 21/566 (2013.01); G06F 2221/033 (2013.01)

(58) Field of Classification Search
CPC ............................... G06F 21/53; G06F 21/563
See application file for complete search history.

(56) References Cited

U.S. PATENT DOCUMENTS

| 8,776,223 | B2 | 7/2014 | Balakrishnan et al. |
| 9,147,070 | B2 | 9/2015 | Panchenko et al. |
| 9,262,627 | B2 | 2/2016 | Komaromy et al. |
| 2002/0078368 | A1* | 6/2002 | Yann ...................... G06F 21/563 726/24 |
| 2013/0305373 | A1* | 11/2013 | Lim ......................... G06F 21/56 726/24 |
| 2015/0278516 | A1 | 10/2015 | Caprioli |
| 2016/0078222 | A1 | 3/2016 | Patel et al. |
| 2016/0196425 | A1* | 7/2016 | Davidov ............... G06F 21/566 726/23 |
| 2016/0283716 | A1* | 9/2016 | Momot ................. G06F 21/566 |

OTHER PUBLICATIONS

Salwan, J., "An introduction to the Return Oriented Programming and ROP chain generation," Course lecture at Bordeau University for the CSI Master, Nov. 2014, 65 pages.
"Ropper—ROP Gadget Finder and Binary Information Tool," downloaded from https://scoding.de/ropper/ on Sep. 22, 2016.

(Continued)

*Primary Examiner* — Khalil Naghdali
(74) *Attorney, Agent, or Firm* — Womble Bond Dickinson (US) LLP; Daniel E. Ovanezian

(57) ABSTRACT

A system and method for identifying exploitable code sequences. In one implementation, a first processing device identifies an executable portion of a program and a set of registers of a second processing device, and stores a set of addresses in the set of registers. The first processing device allocates a region of memory populated with a set of values, and sets a stack pointer of the second processing device to point to a first location within the region of memory. The first processing device emulates an execution by the second processing device of an instruction at a first address of the executable portion. In response to determining that, after the emulating of the instruction at the first address, an address of a next instruction to execute after the instruction at the first address is in the set of addresses or the set of values, a signal is generated that indicates a potential exploitable code sequence.

20 Claims, 7 Drawing Sheets

(56) References Cited

OTHER PUBLICATIONS

Bletsch, T. et al., "Jump-Oriented Programming: A New Class of Code-Reuse Attack," ASIACCS, Mar. 22-24, 2011, 10 pages, Hong Kong, China.

Carlini, N. et al., "ROP is Still Dangerous: Breaking Modern Defenses" 23rd USENIX Security Symposium (USENIX Security 14) Aug. 20-22, 2014, 15 pages.

Follner, A., et al., "ROPocop—dynamic Mitigation of Code-Reuse Attacks" Technical report, EC SPRIDE, Apr. 9, 2015, 15 pages.

Kayaalp, M., et al. "Signature-Based Protection from Code Reuse Attacks" Binghamton University, IEEE Transactions on Computers, Feb. 2015, pp. 533-546, vol. 64, No. 2.

Pappas, V., "Defending against Return-Oriented Programming" Doctoral thesis, Columbia University, 2015, 127 pages.

Schuster, F., et al., "Counterfiet Object-oriented Programming" IEEE Symposium on Security and Privacy, Mar. 28, 2015, 18 pages.

Schuster, F., et al., "Evaluating the Effectiveness of Current Anti-ROP Defenses" Springer International Publishing, Jul. 29, 2014, 21 pages.

\* cited by examiner

IDENTIFYING EXPLOITABLE CODE SEQUENCES

TECHNICAL FIELD

The present disclosure is generally related to computer systems, and more particularly, computer security.

BACKGROUND

An exploitable code sequence (ICS) is a sequence of executable computer commands having one or more programming errors ("bugs") or vulnerabilities that allow malicious behavior, such as gaining control of a computer system, escalating privileges, launching denial-of-service attacks, and so forth.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
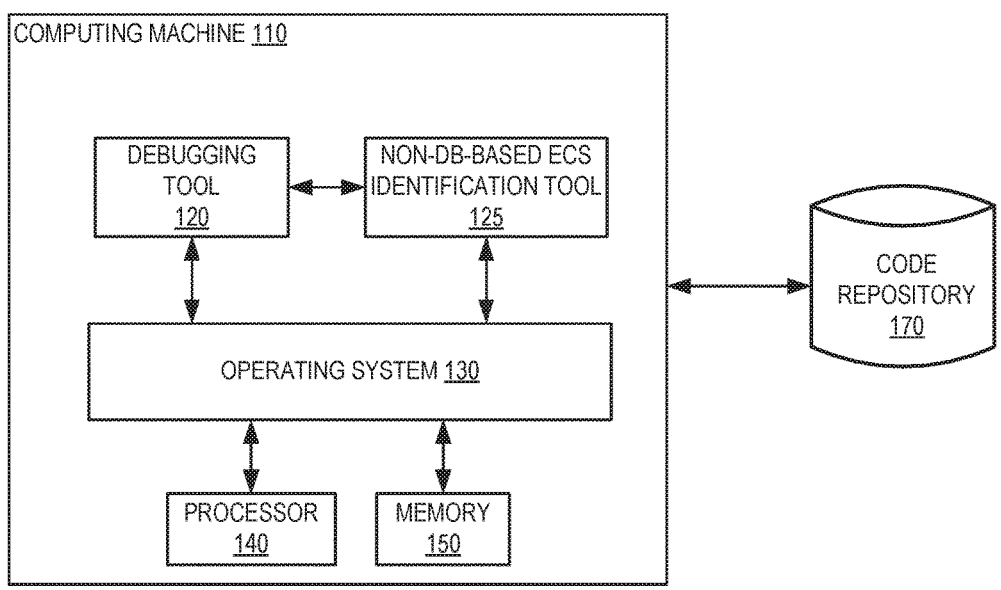
FIG. 1 depicts an illustrative computer system architecture, in accordance with one or more aspects of the present disclosure.

Described herein are methods and systems that enable identification of exploitable code sequences. As noted above in the Background, an exploitable code sequence (ECS) is a sequence of executable computer commands having one or more programming errors ("bugs") or vulnerabilities that allow malicious behavior, such as gaining control of a computer system, escalating privileges, launching denial-of-service attacks, and so forth. Existing solutions attempt to identify ECSs in an executable program by checking a database of known ECSs for matches with code sequences of the executable program. However, ECS databases may not be complete in the sense that other ECSs may exist that are not in the databases; moreover, when a new ECS is discovered, ECS databases may not be updated in a timely manner.

Aspects of the present disclosure address the above and other deficiencies by providing a technology that enables identification of exploitable code sequences without the use of a database of known exploitable code sequences. Aspects of the present disclosure accomplish this by detecting code sequences of a program that read a register of a processing device that stores some address, and then continue execution (or "jump") to the address read from the register. Such a code sequence could be exploited by a malicious hacker by storing in the register an address outside the executable program (e.g., a starting address of malicious code that the hacker has stored in another portion of memory outside the footprint of the executable program.) Aspects of the present disclosure detect such code sequences by storing a selected address in a register (e.g., some address outside of the program, some address in a non-executable portion of the program, etc.) and subsequently noting whether, after an emulation of the execution of the program, execution jumps to this selected address. If this occurs, then the code sequence that results in such a jump may be exploitable by a malicious hacker.

In some implementations of the present disclosure, the detection procedure described above is performed for multiple registers. For example, a first selected address may be stored in a first register, a second selected address may be stored in a second register, and so forth, and if execution jumps to any of the selected addresses, the code sequence is reported as potentially exploitable.

Some implementations of the present disclosure perform another check by allocating a region of memory, populating the region with a set of selected values (e.g., values of addresses outside of the program that are different than the addresses selected for storage in registers, values of addresses in a non-executable portion of the program that are different than the addresses selected for storage in registers, etc.), and setting the stack pointer to point to an instruction in the region of memory. If, after emulating an execution of the instruction, execution jumps to an instruction in the set of values, then the code sequence could potentially be exploited by a malicious hacker by placing specific addresses on the execution stack of the executable program, and using the code sequence to transfer control to a function of their choosing.

As described in detail below with respect to FIG. 3, in one implementation a first processing device identifies an executable portion of a program and a set of registers of a second processing device, and stores a set of addresses in the set of registers. The first processing device allocates a region of memory populated with a set of values, and sets a stack pointer of the second processing device to point to a first location within the region of memory. The first processing device emulates an execution by the second processing device of an instruction at a first address of the executable portion. In response to determining that, after the emulating of the instruction at the first address, an address of a next instruction to execute after the instruction at the first address is in the set of addresses or the set of values, a signal is generated that indicates a potential exploitable code sequence. In response to the signal, a developer may do one or more of the following: verify that the code sequence is exploitable; add the code sequence to a database of known exploitable code sequences; or modify the code of the program so that the sequence is no longer exploitable.

Accordingly, aspects of the present disclosure are capable of identifying a "new" exploitable code sequence, in the sense that the exploitable code sequence is not included in a database of known exploitable code sequences. When exploitable code sequences are identified and corrected (e.g., by modifying the code sequence to eliminate its exploitation potential, etc.), the operation of a computer system is improved by making the computer system less susceptible to certain exploits and thereby increase the security of the computer system.

FIG. 1 depicts an illustrative computer system 100, in accordance with one or more aspects of the present disclosure. As shown in FIG. 1, the computer system 100 includes a computing machine 110, and a code repository 170. The computing machine 110 and the code repository 170 may communicate via Ethernet, TCP/IP, Fibre Channel, USB, etc.

Code repository 170 is a persistent storage that is capable of storing executable programs. In some embodiments, code repository 170 might be a network-attached file server, while in other embodiments project repository 170 might be some other type of persistent storage such as an object-oriented database, a relational database, and so forth, that may be hosted by computing machine 110.

Computing machine 110 may be a rackmount server, a router computer, a personal computer, a laptop computer, a tablet computer, or any combination of the above. Computing machine 110 includes a processor 140 and a memory device 150. "Memory device" herein refers to a volatile or non-volatile memory device, such as Random Access Memory (RAM), Read-Only Memory (ROM), Electrically Erasable Programmable ROM (EEPROM), or any other device capable of storing data.

"Processor" herein refers to a device capable of executing instructions encoding arithmetic, logical, or I/O operations. In one example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Computing machine 110 includes an operating system (OS) 130 that manages the hardware resources of the server machine and provides functions such as interprocess communication, scheduling, virtual memory management, and so forth. In one aspect, computing machine 110 also includes a debugging tool 120 that enables a user to step through program instructions; execute the instructions; and emulate execution of the instructions, rather than direct execution of the instructions by processor 140.

In one aspect, computing machine 110 also includes a non-database-based (non-DB) exploitable code sequence (ECS) identification tool component 125 that enables identification of exploitable code sequences without the use of a database of known exploitable code sequences. Non-DB ECS identification tool 125 may perform one or more functions of methods 200, 300, 400, and 500 (e.g., storing a set of addresses in a set of registers, determining whether a next instruction to execute is at an address in the set of addresses, etc.), as described in detail below with respect to FIGS. 2 through 5.

Figure 2:
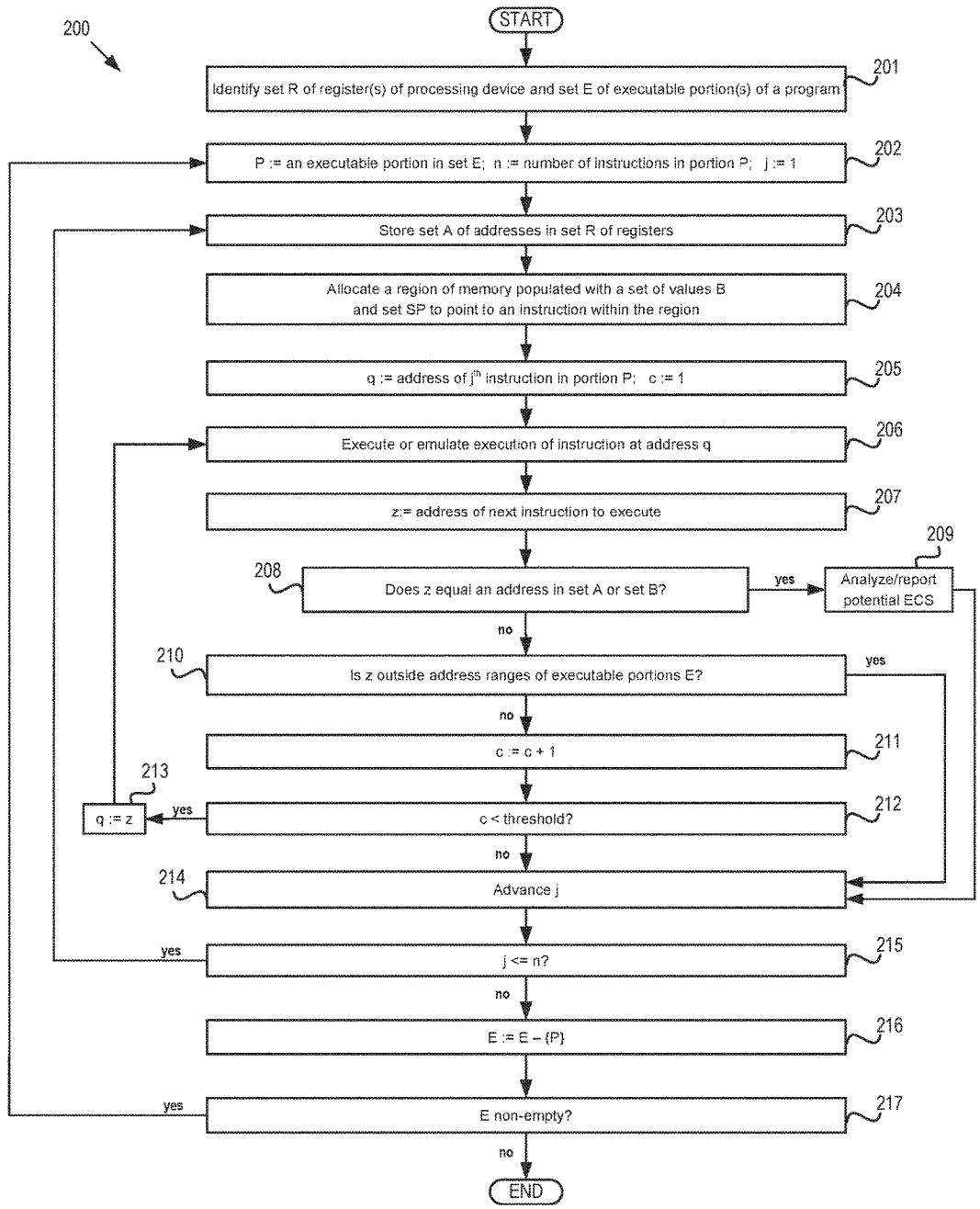
FIG. 2 depicts a flow diagram of one example of a method for identifying exploitable code sequences, in accordance with one or more aspects of the present disclosure.

FIG. 2 depicts a flow diagram of one example of a method 200 for identifying exploitable code sequences, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 200 is performed by processing device 140 of computing machine 110, and one or more blocks of the method may be performed by non-DB ECS identification tool 125. It should be noted that in some implementations blocks depicted in FIG. 2 may be performed simultaneously or in a different order than that depicted. It should further noted that, for space reasons, some blocks in FIG. 2 may comprise a plurality of sub-blocks (e.g., multiple tasks, etc.), and the sub-blocks may be performed simultaneously or in a different order than that depicted At block 201, a set R of one or more registers of a processing device is identified, and a set E of one or more executable portions of a program (as opposed to data portions of the program, for example) is identified. In one example, the set R of register(s) does not include either the program counter or the stack pointer of the processing device, because addresses outside the executable program cannot be stored in these registers by the executable program, which is in user space, rather than in a kernel. In contrast, such addresses can be stored in other registers by executable programs in user space.

In some examples, the processing device executing the method 200 (e.g., processing device 140, etc.) might be different than the processing device comprising the set R of register(s), while in some other examples the two processing devices may be the same. In the former case, the processing device comprising the set R of register(s) might be of a different type than the processing device executing method 200 (e.g., one processing device might be an Intel x86 processor and the other might be an ARM-based processor, etc.).

At block 202, variable P is set to an executable portion in set E, variable n is set to the number of instructions in portion P; and variable j is initialized to 1. Variable P iterates through the executable portions in set E. For example, if set E has three executable portions, then the ECS identification tasks described below are performed for one of the executable portions in set E, then a second one of the executable portions in set E, and then the third executable portion in set E. The way that this occurs is as follows: as described above, variable P is set to an executable portion in set E; then after the ECS identification tasks described below are performed for executable portion P, executable portion P is removed from the set E of executable portions (block 216 below), and variable P is set to one of the remaining executable portions in set E, if set E is non-empty (block 217 below). If set E is empty, then all of the identified executable portions have been processed.

At block 203, a set A of addresses is stored in registers R, as previously described at FIG. 1. For example, a first address of set A might be stored in a first register of set R, a second address of set A might be stored in a second register of set R, etc.). As described below, method 200 checks whether execution of the program proceeds ("jumps") to an address stored in registers R, in which case the pertinent code of the program may be vulnerable to hijacking or other types of malicious behavior.

At block 204, a region of memory is allocated and populated with a set of values B, and the stack pointer of the processing device is set to point to a location within the region. In one example, the particular location is selected to be approximately halfway within the region of memory, as a heuristic. As described below, method 200 checks whether execution of the program jumps to an address in set B, in which case the pertinent code of the program may again be vulnerable to hijacking or other types of malicious behavior.

At block 205, a variable q is set to the address of the $j^{th}$ instruction in portion P, and a counter c is initialized to 1. At block 206, the instruction at address q is either executed directly, or its execution is emulated (e.g., by debugging tool 120, etc.).

At block 207, a variable z is set to the address of the next instruction to execute. Block 208 checks whether z equals to an address in either set A or set B. If so, the execution of method 200 proceeds to block 209, otherwise execution continues at block 209.

At block 209, the potential ECS discovered at blocks 207 and 208 is reported and analyzed. In one implementation, the potential ECS is reported via a signal (e.g., a message, etc.), and the signal may specify one or more of the following:
- the sequence of instructions in the program associated with the potential ECS;
- a starting address of the potential ECS;
- a particular instruction within the potential ECS that sets the value of a register in set R; or
- a particular instruction within the potential ECS that changes the value of a register in set R.

Block 210 checks whether variable z (which was set at block 207) is outside the address ranges of all the executable portions E. If not, which indicates that a vulnerability has not been found in the current code sequence, execution proceeds to block 211, otherwise execution continues at block 214.

At block 211, counter c is incremented by 1. Block 212 checks whether counter c, which represents the number of instructions of portion P, is less than a threshold. In one implementation, the threshold represents a "cutoff" at which time the method infers that portion P contains an infinite loop, and consequently stops testing portion P, for otherwise the current code sequence will be checked for vulnerabilities forever. If counter c is less than the threshold, execution proceeds to block 213, otherwise execution continues at block 214.

Block 213 sets variable q to variable z, so that the next execution of the loop continues at the next instruction in the sequence. (Recall that z is the address of the next instruction to execute. Also note that the next instruction to execute is not always the immediately-following instruction, so the method uses these variables q and z to advance through instructions of the code sequence, rather than using an index that is incremented at each iteration.) Execution then continues back at block 206.

Block 214 advances variable j, where the advancing may depend on the architecture of the processing device; for example, for some processing devices variable j may be incremented by 1, while for some other processing devices (e.g., RISC processors, etc.), variable j may be incremented by a larger integer. (Note that in this case an index is used because the method checks for an exploitable code sequence beginning at the first instruction, then checks for an exploitable code sequence beginning at the second instruction, and so forth. Also note that a code sequence beginning at the second instruction is not just the code sequence beginning at the first instruction, without the first instruction. Rather, these code sequences can differ in other ways due to test-and-branches, the states of variables, jumps, and so forth.)

Block 215 checks whether j<=n. If so, execution continues back at block 203, otherwise execution proceeds to block 216.

At block 216, portion P is removed from set E, because it has already been processed, and at block 217, execution branches based on whether set E is non-empty after the removal of P. As described above at block 202, if E is non-empty, then there are still one or more executable portions to be processed, and execution continues back at block 202 to process the next executable portion. Otherwise, there are no more executable portions to process, and method 200 terminates.

Figure 3:
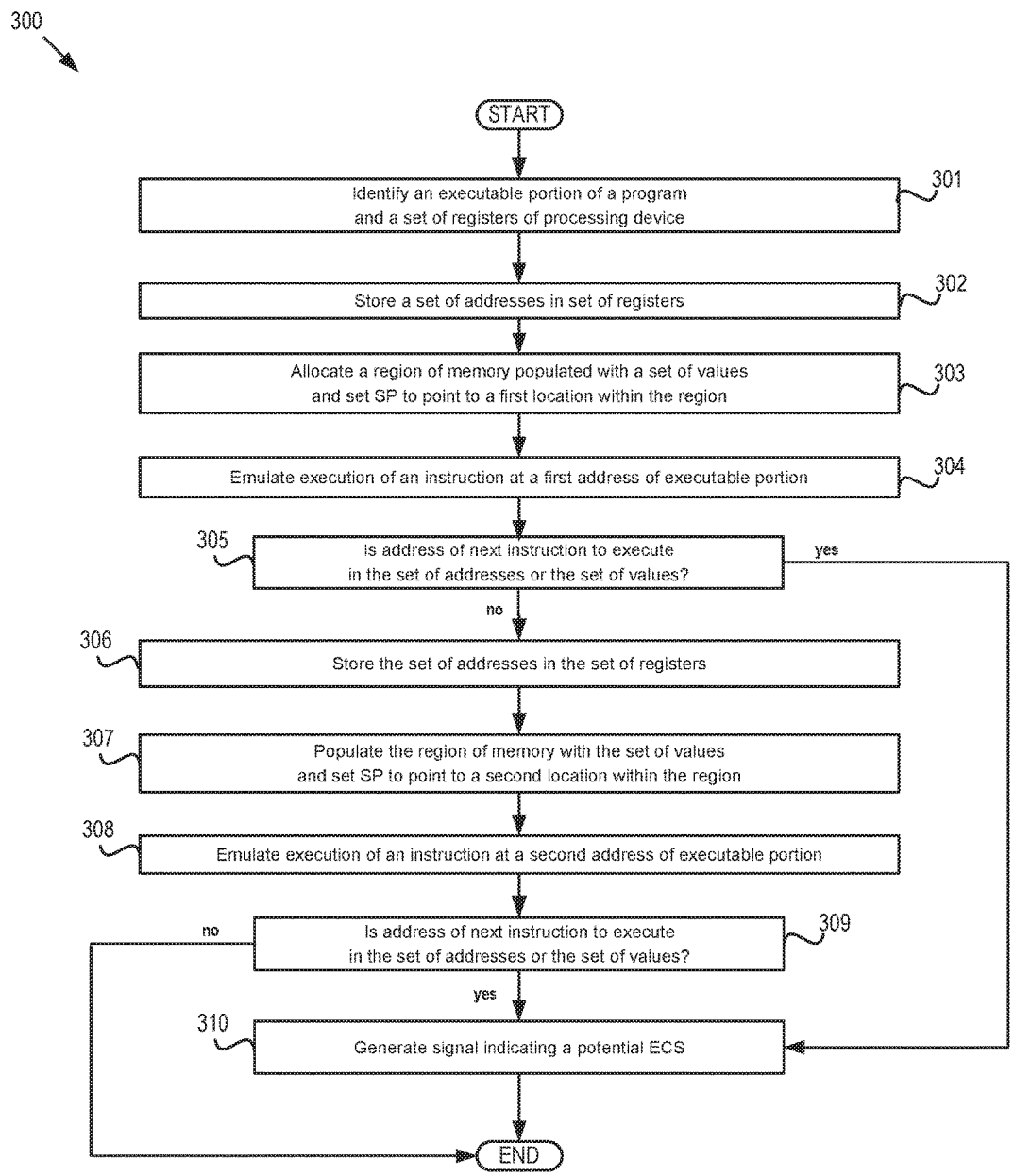
FIG. 3 depicts a flow diagram of another example of a method for identifying exploitable code sequences, in accordance with one or more aspects of the present disclosure.

FIG. 3 depicts a flow diagram of another example of a method 300 for identifying exploitable code sequences, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 300 is performed by processing device 140 of computing machine 110, and one or more blocks of the method may be performed by non-DB ECS identification tool 125. It should be noted that in some implementations blocks depicted in FIG. 3 may be performed simultaneously or in a different order than that depicted.

At block 301, an executable portion of a program (e.g., a program stored in repository 170, etc.) and a set of registers of a processing device are identified. In one example, the set of registers does not include either the program counter or the stack pointer of the processing device.

At block 302, a set of addresses is stored in the set of registers (e.g., a first address in the set of addresses is stored in a first register of the set of registers, a second address in the set of addresses is stored in a second register of the set of registers, etc.). As described below, method 300 checks whether execution of the program jumps to an address stored in the set of registers, in which case the pertinent code of the program may be vulnerable to hijacking or other types of malicious behavior.

At block 303, a region of memory is allocated and populated with a set of values, and the stack pointer of the processing device is set to point to a first location within the region. In one example, the first location is approximately halfway within the region of memory. As described below, method 300 checks whether execution of the program jumps to an address in the set of values stored in the region of memory, in which case the pertinent code of the program may again be vulnerable to hijacking or other types of malicious behavior.

At block 304, execution of an instruction at a first address of the executable portion is emulated (e.g., by debugging tool 120, etc.). Block 305 checks whether the address of the next instruction to execute is in the set of addresses or the set of values. If so, the execution of method 200 proceeds to block 310, otherwise execution proceeds to block 306.

At block 306, the set of addresses is stored in the set of registers (this is done again because the contents of the registers may have changed by the instruction at the first address). At block 307, the allocated region of memory is populated with the set of values (again this is done in case the contents of the region has changed by the instruction at the first address), and the stack pointer is set to point to a second location within the region. In some examples, the second location within the region might be different than the first location within the region, while in some other examples the two locations might be the same.

At block 308, execution of an instruction at a second address of the execution portion is emulated. Block 309 checks whether the address of the next instruction to execute is in the set of addresses or the set of values. If so, the execution of method 300 proceeds to block 310, otherwise execution of the method terminates.

At block 310, a signal is generated indicating a potential ECS. In one implementation, the signal may specify one or more of the following:
- the sequence of instructions in the program associated with the potential ECS;
- a starting address of the potential ECS;
- a particular instruction within the potential ECS that sets the value of a register in the set of registers; or
- a particular instruction within the potential ECS that changes the value of a register in the set of registers.

Figure 4:
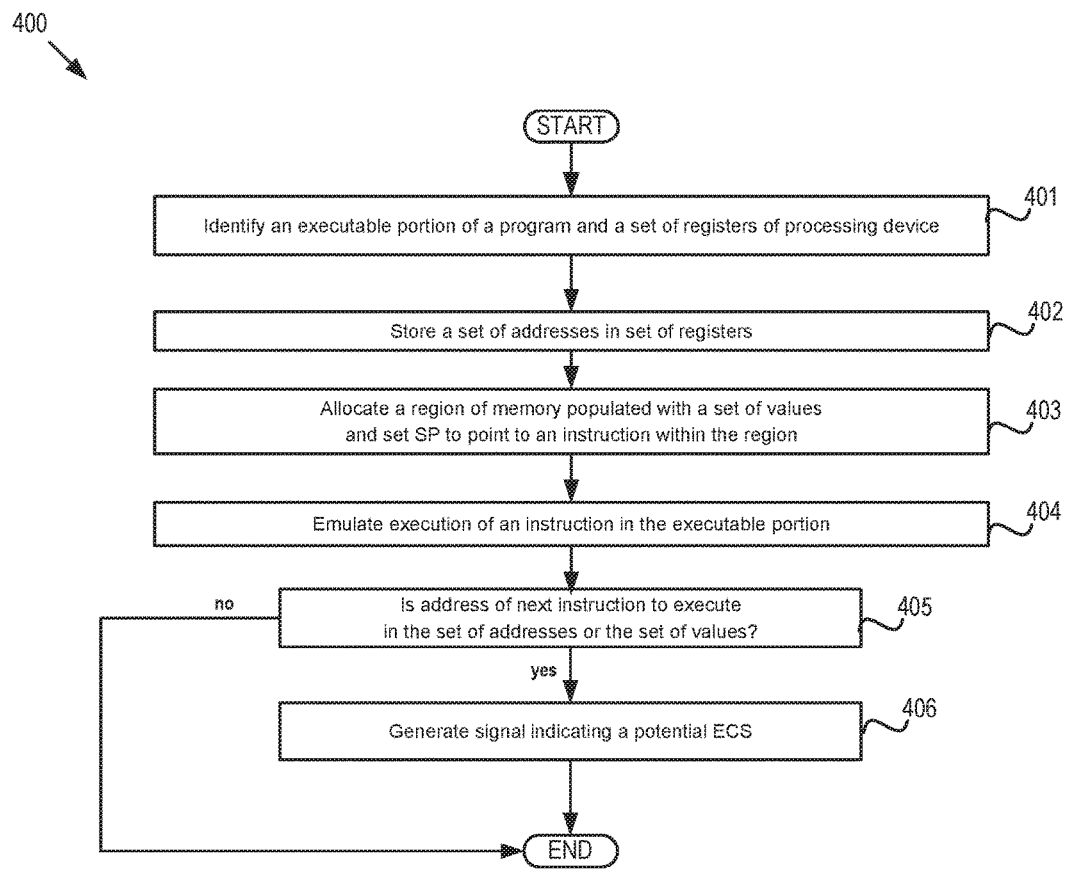
FIG. 4 depicts a flow diagram of another example of a method for identifying exploitable code sequences, in accordance with one or more aspects of the present disclosure.

FIG. 4 depicts a flow diagram of another example of a method 400 for identifying exploitable code sequences, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 400 is performed by processing device 140 of computing machine 110, and one or more blocks of the method may be performed by non-DB ECS identification tool 125. It should be noted that in some implementations blocks depicted in FIG. 4 may be performed simultaneously or in a different order than that depicted.

At block 401, an executable portion of a program (e.g., a program stored in repository 170, etc.) and a set of registers of a processing device are identified. In one example, the set of registers does not include either the program counter or the stack pointer of the processing device.

At block 402, a set of addresses is stored in the set of registers (e.g., a first address in the set of addresses is stored in a first register of the set of registers, a second address in the set of addresses is stored in a second register of the set of registers, etc.). As described below, method 300 checks whether execution of the program jumps to an address stored in the set of registers, in which case the pertinent code of the program may be vulnerable to hijacking or other types of malicious behavior.

At block 403, a region of memory is allocated and populated with a set of values, and the stack pointer of the processing device is set to point to a first location within the region. In one example, the first location is approximately halfway within the region of memory. As described below, method 400 checks whether execution of the program jumps to an address in the set of values stored in the region of memory, in which case the pertinent code of the program may again be vulnerable to hijacking or other types of malicious behavior.

At block 404, execution of an instruction in the executable portion is emulated (e.g., by debugging tool 120, etc.). Block 405 checks whether the address of the next instruction to execute is in the set of addresses or the set of values. If so, execution proceeds to block 406, otherwise the execution of method 400 terminates.

At block 406, a signal is generated indicating a potential ECS. In one implementation, the signal may specify one or more of the following:
- the sequence of instructions in the program associated with the potential ECS;
- a starting address of the potential ECS;
- a particular instruction within the potential ECS that sets the value of a register in the set of registers; or
- a particular instruction within the potential ECS that changes the value of a register in the set of registers.

Figure 5:
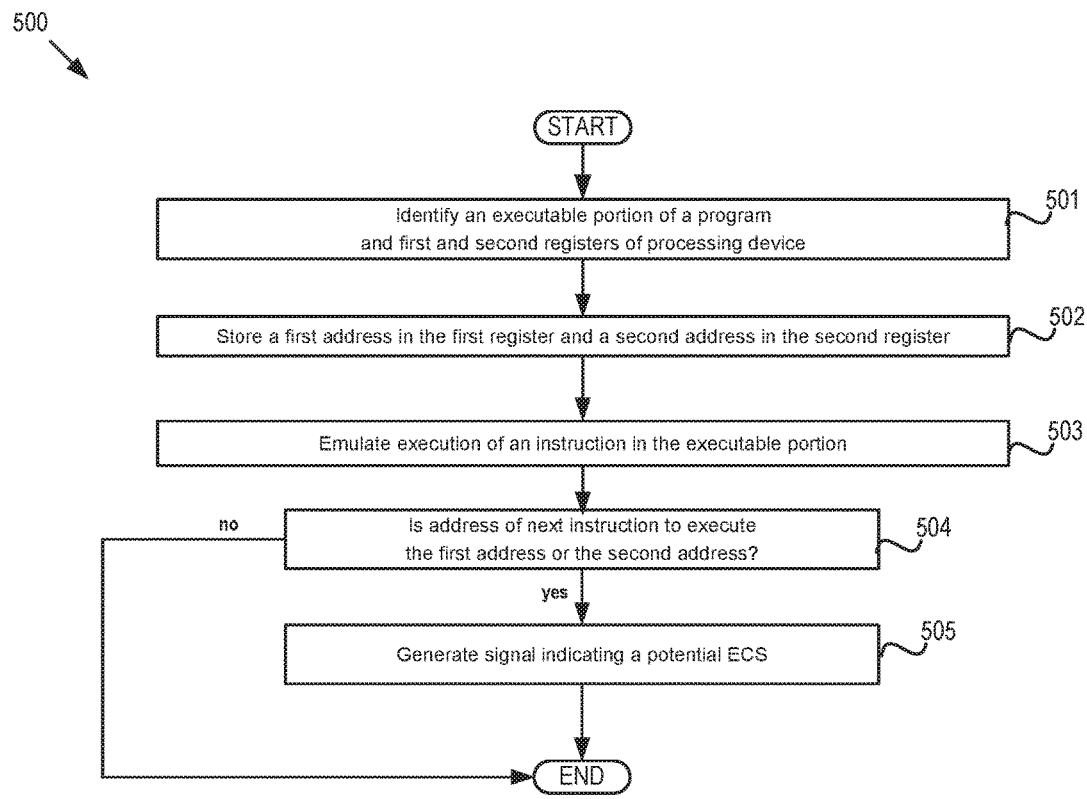
FIG. 5 depicts a flow diagram of another example of a method for identifying exploitable code sequences, in accordance with one or more aspects of the present disclosure.

FIG. 5 depicts a flow diagram of another example of a method 500 for identifying exploitable code sequences, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 500 is performed by processing device 140 of computing machine 110, and one or more blocks of the method may be performed by non-DB ECS identification tool 125. It should be noted that in some implementations blocks depicted in FIG. 5 may be performed simultaneously or in a different order than that depicted.

At block 501, an executable portion of a program (e.g., a program stored in repository 170, etc.) and first and second registers of a processing device are identified. In one example, the first and second registers are neither the program counter nor the stack pointer of the processing device.

At block 502, a first address is stored in a first register and a second address is stored in a second register. As described below, method 500 checks whether execution of the program jumps to the first address or the second address, in which case the pertinent code of the program may be vulnerable to hijacking or other types of malicious behavior.

At block 503, execution of an instruction in the executable portion is emulated (e.g., by debugging tool 120, etc.).

Block 504 checks whether the address of the next instruction to execute is the first address or the second address. If so, execution proceeds to block 505, otherwise the execution of method 500 terminates.

At block 505, a signal is generated indicating a potential ECS. In one implementation, the signal may specify one or more of the following:
- the sequence of instructions in the program associated with the potential ECS;
- a starting address of the potential ECS;
- a particular instruction within the potential ECS that sets the value of the first register or the second register; or
- a particular instruction within the potential ECS that changes the value of the first register or the second register.

Figure 6:
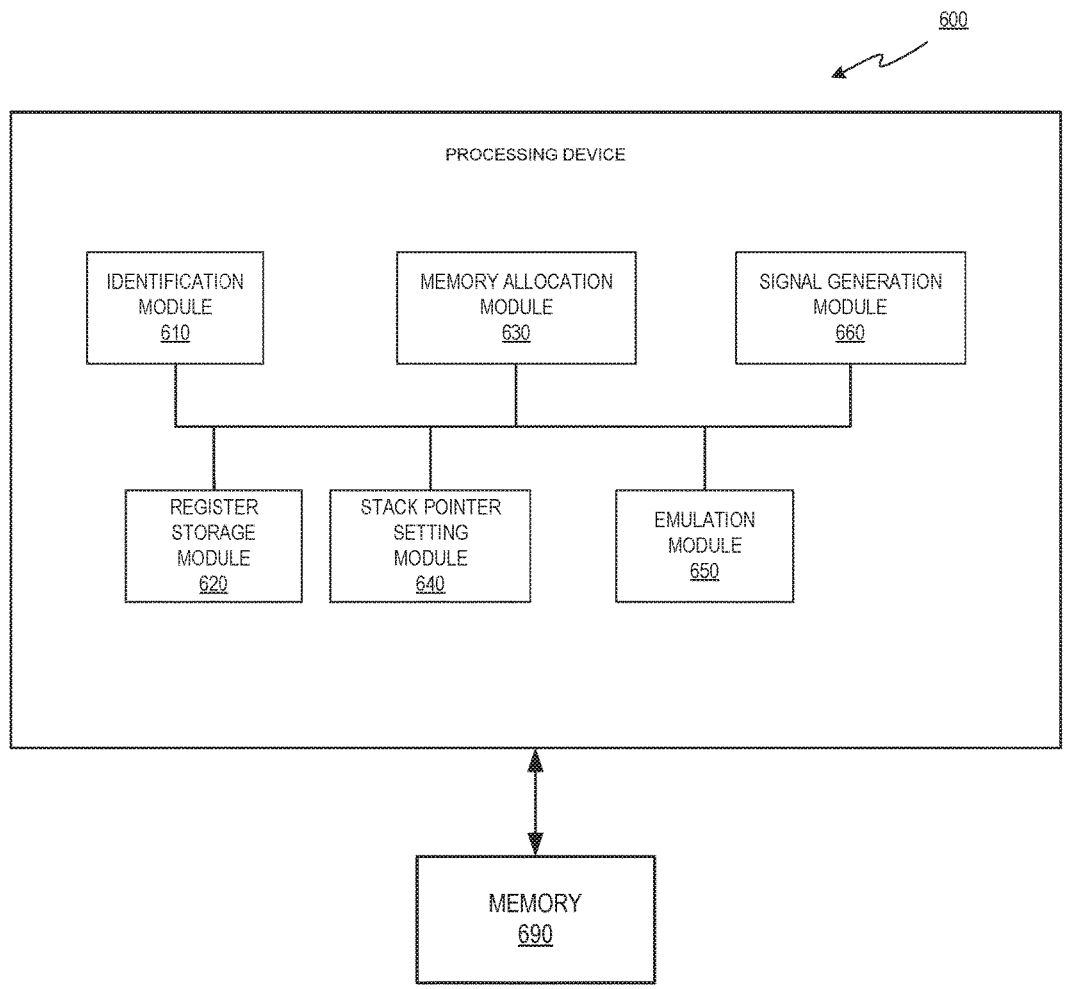
FIG. 6 depicts a block diagram of an illustrative computer system operating in accordance with one or more aspects of the disclosure.

FIG. 6 depicts a block diagram of an illustrative computer system 600 operating in accordance with one or more aspects of the present disclosure. In various illustrative examples, computer system 600 may correspond to a computing device within system architecture 100 of FIG. 1. Computer system 600 comprises a memory and a processing device that may include components to enable identification of potential ECSs. In one example, the processing device may include an identification module 610, a register storage module 620, a memory allocation module 630, a program counter setting module 640, an emulation module 650, and a signal generation module 660.'

In one implementation, identification module 610 identifies an executable portion of a program and a set of registers of a processing device. Register storage module 620 stores a set of addresses in the set of registers. Memory allocation module 630 allocates a region of the memory populated with a set of values. Stack pointer setting module 640 sets a stack pointer of the second processing device to point to a first location within the region of memory. Emulation module 650 emulates an execution by the processing device of an instruction in the executable portion. Signal generation module 660 determines that, after the emulation, an address of a next instruction to execute is in the set of addresses or the set of values, and in response generates a signal that indicates a potential exploitable code sequence.

Figure 7:
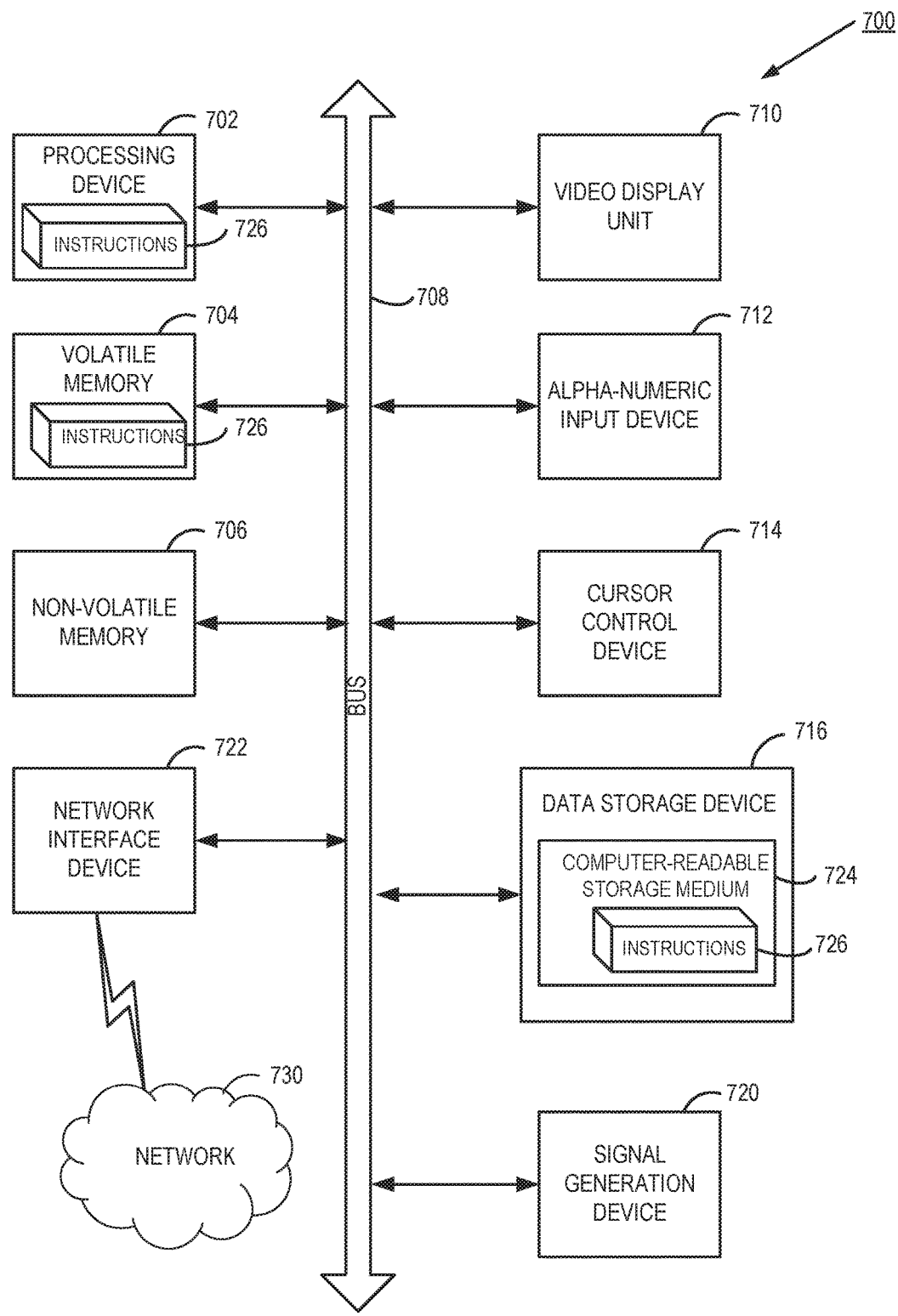
FIG. 7 depicts a block diagram of another illustrative computer system operating in accordance with one or more aspects of the disclosure.

FIG. 7 depicts a block diagram of another illustrative computer system 700 operating in accordance with one or more aspects of the present disclosure. In various illustrative examples, computer system 700 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network 730, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 200, 300, 400, and/or 500 of FIGS. 2 through 5.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "identifying," "storing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, and 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    identifying, by first processing device, an executable portion of a program and a set of registers of a second processing device;
    storing, by the first processing device, a set of addresses in the set of registers;
    allocating, by the first processing device, a region of memory populated with a set of values;
    setting, by the first processing device, a stack pointer of the second processing device to point to a first location within the region of memory;
    emulating, by the first processing device, an execution by the second processing device of an instruction at a first address of the executable portion;
    in response to determining that, after the emulating of the instruction at the first address, an address of a next instruction to execute after the instruction at the first address is in the set of addresses or the set of values, generating a first signal that indicates a first potential exploitable code sequence, wherein the first exploitable code sequence is a sequence of executable computer commands having one or more programming errors or vulnerabilities;
    storing, by the first processing device, the set of addresses in the set of registers;
    populating, by the first processing device, the region of memory with the set of values;
    setting, by the first processing device, the stack pointer of the second processing device to point to a second location within the region of memory;
    emulating, by the first processing device, an execution by the second processing device of an instruction at a second address of the executable portion; and
    in response to determining that, after the emulating of the instruction at the second address, an address of a next instruction to execute after the instruction at the second address is in the set of addresses or the set of values, generating a second signal that indicates a second potential exploitable code sequence.

2. The method of claim 1 wherein the set of registers does not include a program counter, and wherein the set of registers does not include the stack pointer of the second processing device.

3. The method of claim 1 wherein the set of values within the region of memory is halfway within the region of memory.

4. The method of claim 3 wherein the first processing device is of a first type of processing device, and wherein the second processing device is of a second type of processing device that is different than the first type of processing device.

5. The method of claim 1 wherein the first processing device is of a first type of processing device, and wherein the second processing device is of the first type of processing device.

6. The method of claim 1 wherein the instruction within the region of memory is the same as the next instruction within the region of memory.

7. The method of claim 1 wherein the instruction within the region of memory is different than the next instruction within the region of memory.

8. The method of claim 1 wherein the first signal specifies a sequence of instructions in the program associated with the first potential exploitable code sequence.

9. An apparatus comprising:
    a memory; and
    a first processing device, operatively coupled to the memory, to:
        identify an executable portion of a program and a set of registers of a second processing device;
        store a set of addresses in the set of registers;
        allocate a region of the memory populated with a set of values;
        set a stack pointer of the second processing device to point to a first location within the region of memory;
        emulate an execution by the second processing device of an instruction in the executable portion;
        in response to determining that, after the emulation, an address of a next instruction to execute is in the set of addresses or the set of values, generating a signal that indicates a potential exploitable code sequence, wherein the potential exploitable code sequence is a sequence of executable computer commands having one or more programming errors or vulnerabilities.

10. The apparatus of claim 9 wherein the set of registers does not include a program counter, and wherein the set of registers does not include the stack pointer of the second processing device.

11. The apparatus of claim 9 wherein the instruction within the region of the memory is halfway within the region of the memory.

12. The apparatus of claim 9 wherein the first processing device is of a first type of processing device, and wherein the second processing device is of a second type of processing device that is different than the first type of processing device.

13. The apparatus of claim 9 wherein the first processing device is of a first type of processing device, and wherein the second processing device is of the first type of processing device.

14. A non-transitory computer-readable storage medium comprising code that, when executed by a first processing device, cause the first processing device to:
    identify, by the first processing device, an executable portion of a program, a first register of a second processing device, and a second register of the second processing device;
    storing, by the first processing device, a first address in the first register and a second address in the second register;
    emulating, by the first processing device, an execution by the second processing device of an instruction in the executable portion;
    in response to determining that, after the emulating, an address of a next instruction to execute equals the first address or the second address, generating a signal that indicates a potential exploitable code sequence, wherein the first exploitable code sequence is a sequence of executable computer commands having one or more programming errors or vulnerabilities.

15. The non-transitory computer-readable storage medium of claim 14, wherein the first register is not a program counter of the second processing device, and wherein the second register is not the program counter, and wherein the first register is not a stack pointer of the second processing device, and wherein the second register is not the stack pointer.

16. The non-transitory computer-readable storage medium of claim 14,
wherein the code further causes the first processing device to:
in response to the determining, identifying in the potential exploitable code sequence an instruction that sets the first register to a first value.

17. The non-transitory computer-readable storage medium of claim 14,
wherein the code further causes the first processing device to:
in response to the determining, identifying in the potential exploitable code sequence an instruction that changes a value of the first register.

18. The non-transitory computer-readable storage medium of claim 14, wherein the signal specifies a starting address of the potential exploitable code sequence.

19. The non-transitory computer-readable storage medium of claim 14, wherein the first processing device is of a first type of processing device, and wherein the second processing device is of a second type of processing device that is different than the first type of processing device.

20. The non-transitory computer-readable storage medium of claim 14, wherein the first processing device is of a first type of processing device, and wherein the second processing device is of the first type of processing device.

* * * * *